United States Patent
Sakabe et al.

[15] 3,665,149
[45] May 23, 1972

[54] DIRECT-CURRENT ARC WELDER

[72] Inventors: Akira Sakabe, Urawa; Kinji Sugimoto, Tokyo, both of Japan

[73] Assignee: Hitachi, Ltd., Tokyo, Japan

[22] Filed: Mar. 9, 1970

[21] Appl. No.: 17,569

[30] Foreign Application Priority Data

Mar. 19, 1969  Japan..................................44/20362

[52] U.S. Cl. .........................................................219/131 R
[51] Int. Cl..............................................................B23k 9/10
[58] Field of Search........................................219/131, 131 R

[56] References Cited

UNITED STATES PATENTS

| | | | |
|---|---|---|---|
| 3,249,735 | 5/1966 | Needham | 219/131 R |
| 3,339,107 | 8/1967 | Aldenhoff | 219/131 X |
| 3,521,027 | 7/1970 | Needham et al. | 219/131 R |
| 3,539,764 | 11/1970 | Lucey | 219/131 R |
| 3,371,242 | 2/1968 | Aldenhoff et al. | 219/135 X |

Primary Examiner—C. L. Albritton
Assistant Examiner—J. G. Smith
Attorney—Craig, Antonelli & Hill

[57] ABSTRACT

A direct-current arc welder comprising a transformer having its primary winding connected to an AC power source, controlled rectifier elements respectively connected between the secondary winding of said transformer and a welding circuit including an electrode and a workpiece and series circuits respectively consisting of non-controlled rectifier elements and a current-limiting element and each being connected across the anode and cathode of said each controlled rectifier element, whereby the DC power necessary to maintain an arc between the electrode and the workpiece is supplied to said welding circuit through said controlled rectifier elements, while the DC power required to regenerate the arc after extinction is supplied to said welding circuit through said series circuits consisting of said non-controlled rectifier elements and said current-limiting element.

2 Claims, 12 Drawing Figures

Patented May 23, 1972
3,665,149
2 Sheets-Sheet 1
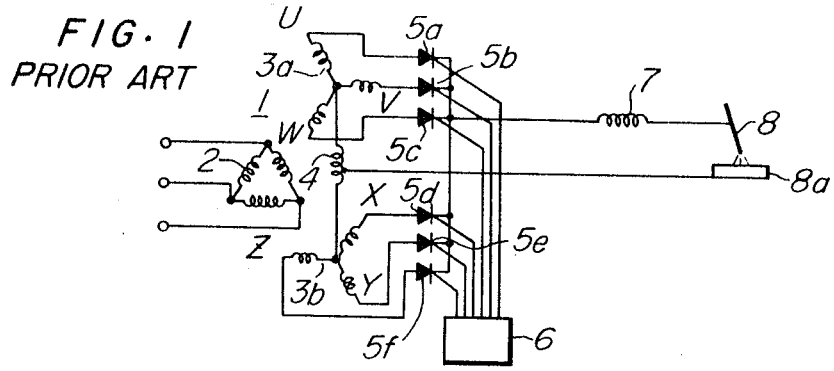
FIG. 1 PRIOR ART
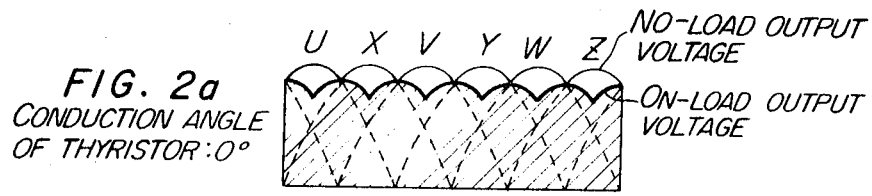
FIG. 2a CONDUCTION ANGLE OF THYRISTOR: 0°
FIG. 2b CONDUCTION ANGLE OF THYRISTOR: 60°
FIG. 2c CONDUCTION ANGLE OF THYRISTOR: 90°
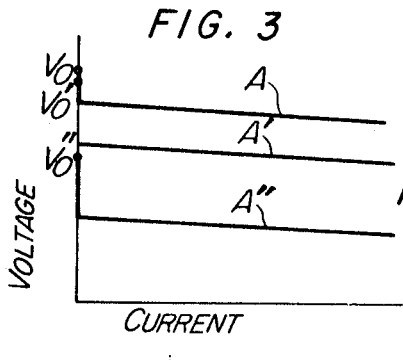
FIG. 3
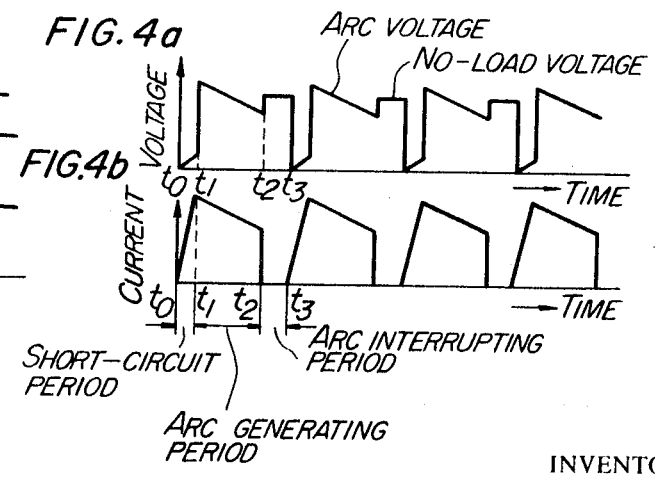
FIG. 4a
FIG. 4b
INVENTORS
AKIRA SAKABE and KINJI SUGIMOTO
BY Craig, Antonelli, Stewart & Hill
ATTORNEY

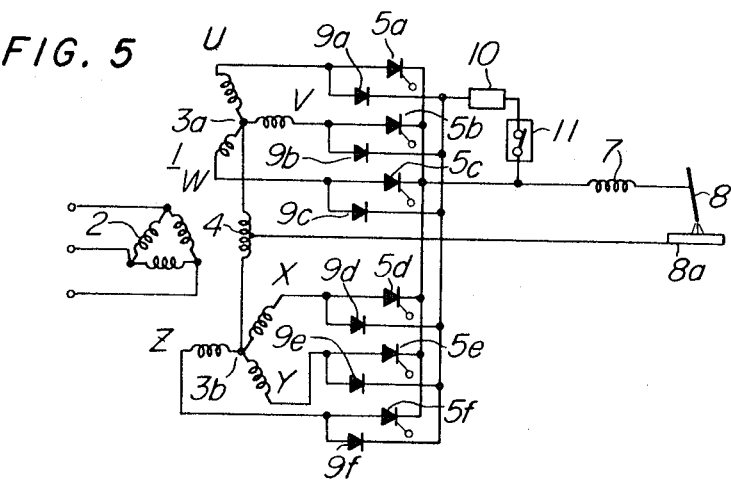
FIG. 5
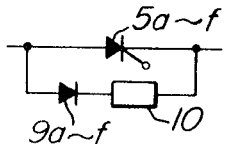
FIG. 6
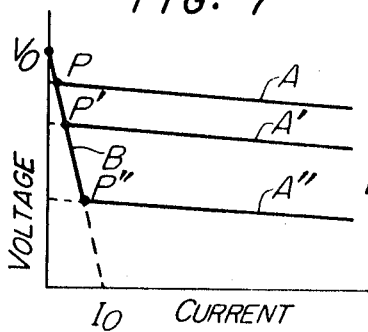
FIG. 7
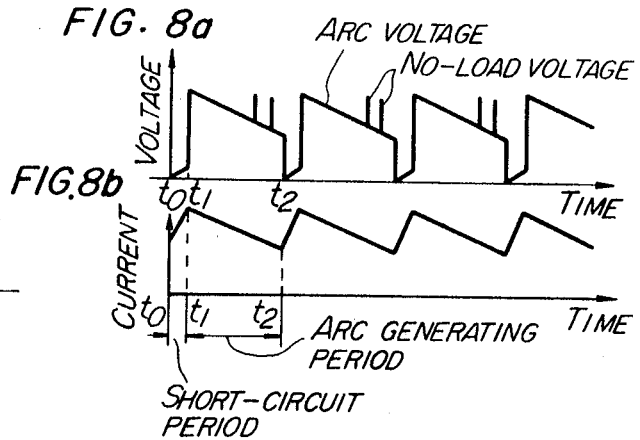
FIG. 8a
FIG. 8b

DIRECT-CURRENT ARC WELDER

BACKGROUND OF THE INVENTION

1. Field of the Invention

This invention relates to direct-current arc welders, and more particularly to a direct-current arc welder for performing arc welding of the dip transfer type wherein arcs of low voltage and small current are produced between an automatically fed, consumable electrode and a parent metal or workpiece covered with an sheath of gas and thereby molten metal is transferred from the electrode to the parent metal through periodically short-circuiting the connection between the electrode and the parent metal.

2. Description of the Prior Art

Many of direct-current arc welders having hitherto been used for welding are of the type in which the secondary side output of a transformer is permitted to pass through a saturable reactor thereby to effect a voltage adjustment and the output voltage thereof is rectified to obtain a DC output. More recently, there has been developed a direct-current arc welder having constant-voltage characteristics in which semiconductor controlled rectifier elements are used to rectify the secondary output of the transformer and simultaneously the output voltage is adjusted through control of the conduction angle of the same controlled rectifier elements, whereby the circuit arrangement is simplified.

The prior art direct-current arc welder using controlled rectifier elements, however, has suffered from a drawback that in case it is used, as hereinbelow explained, for dip transfer type arc welding at a low voltage and small current, the arc is difficult to be stably sustained on account of an increase in the ripple component of the output and a lowering of the no-load voltage and hence good welding results are hard to obtain.

SUMMARY OF THE INVENTION

An object of the invention is to provide a direct-current arc welder so improved as to sustain the arc in a stabilized manner, even in the cases where welding is performed with a low voltage and a small current.

Another object of the invention is to provide a direct-current arc welder having a more stable arc and with a simplified circuit arrangement.

Still another object of the invention is to provide a direct-current arc welder wherein the rapidly rising current which is caused to flow when a pointed end of the electrode touches the parent metal upon starting and thus the arc start-up is facilitated.

In order to accomplish the above objects, in a direct-current arc welder comprising a transformer having its primary winding connected to an AC power source, and controlled rectifier elements respectively connected between the secondary windings of said transformer and a welding circuit including an electrode and a parent metal, whereby the secondary output of said transformer is rectified by means of said controlled rectifier elements and simultaneously the DC output voltage supplied to said welding circuit is adjusted through the control of the conduction angle of said controlled rectifier elements, the invention is characterized in that series circuits respectively consisting of non-controlled rectifier elements being the same in the direction of rectification as said controlled rectifier elements and a current-limiting element are each connected across the anode and cathode of each said controlled rectifier element, whereby the DC power necessary to regenerate the arc is supplied to said welding circuit through said series circuits upon the extinction of the welding arc.

Hereinbelow will be described an embodiment of the invention with reference to the accompanying drawings.

BRIEF DESCRIPTION OF THE DRAWINGS

FIG. 1 is a circuit diagram of prior art direct-current arc welder using controlled rectifier elements.

FIGS. 2a, 2b and 2c are diagrams showing the waveforms of output voltages in the cases where in the direct-current arc welder shown in FIG. 1, the conduction angle of the controlled rectifier elements is made 0°, 60° and 90°, respectively.

FIG. 3 is a diagram showing the external characteristic curves of the direct-current arc welder shown in FIG. 1.

FIGS. 4a and 4b are waveform diagrams of the arc voltage and current, respectively, in the case where arc welding of the dip transfer type is performed with the direct-current arc welder shown in FIG. 1.

FIG. 5 is a circuit diagram of a direct-current arc welder given as one embodiment of the invention.

FIG. 6 is a circuit diagram showing a controlled rectifier element and a series circuit consisting of a non-controlled rectifier element and a current-limiting element and connected across the anode and cathode of the controlled rectifier element, these elements being taken as corresponding to one phase.

FIG. 7 is a diagram showing external characteristic curves of the direct-current arc welder shown in FIG. 5.

FIGS. 8a and 8b are waveform diagrams of the arc voltage and current, respectively, in the case where arc welding of the dip transfer type is carried out with the direct-current arc welder shown in FIG. 5.

DESCRIPTION OF THE PREFERRED EMBODIMENT

In order to facilitate an understanding of the invention, description will first be made of a prior art direct-current arc welder using the controlled rectifier elements, shown in FIG. 1.

A main transformer 1 includes a primary winding 2 and two sets of three-phase secondary windings 3a and 3b having a phase difference of 60° from each other, and the primary winding 2 is supplied with electric power from a three-phase AC power source. Between neutral points of the secondary windings 3a and 3b, there is connected an interphase transformer 4 having a center tap. Semiconductor controlled rectifier elements or thyristors 5a to 5f are respectively connected to output terminals U, V, W, X, Y and Z of the secondary windings 3a and 3b on their anode sides, while they are connected together to a welding electrode 8 through a reactor 7 on their cathode sides. On the other hand, the center tap of the interphase transformer 4 is connected to a workpiece or parent metal 8a to be welded, thus closing a welding circuit including the electrode 8 and the parent metal 8a.

The controlled rectifier elements 5a to 5f are adapted to be supplied from an ignition controlling circuit 6 with gate trigger signals, thereby to control the conduction angle of each phase. For the ignition controlling circuit 6, there may be employed any suitable unit of well known construction.

FIGS. 2a, 2b and 2c show voltage waveforms on the output side of the controlled rectifier elements 5a to 5f in the cases where in the above-described device, the conduction angles of the controlled rectifier elements are made 0°, 60° and 90°, respectively, and in the figures, fine full lines represent no-load output voltages, while thick full lines on-load output voltages (for brevity of explanation, a resistance load in the case where the reactor 7 is omitted being given by way of example.)

The circuit arrangement composed of the secondary windings 3a and 3b of the main transformer, the interphase transformer 4 and the controlled rectifier elements 5a to 5f is known as the double-star six-phase rectifier circuit and may be regarded as a circuit wherein two sets of three-phase half-wave rectifier circuit, respectively consisting of the secondary winding 3a and the controlled rectifier elements 5a to 5c, and the secondary winding 3b and the controlled rectifier elements 5d to 5f, are coupled by the interphase transformer 4. Now consider the case in which the controlled rectifier elements 5a to 5f have a conduction angle of 0°. A voltage is induced in the interphase transformer 4 when the circuit arrangement is loaded, on account of an exciting current caused to flow between the neutral points of the secondary windings 3a and 3b through the respective one controlled rectifier element under the conduction state among the elements 5a to 5c and among those 5d to 5f, belonging to the two sets of three-phase half-wave rectifier circuits. The induced voltage will always equalize the instantaneous values of the voltages of the respective three-phase half-wave rectifier circuits as viewed from the center tap of the interphase transformer 4, with the result that the two sets of three-phase half-wave rectifier circuit are run in parallel. It will be understood that the instantaneous value of the DC output voltage in this case becomes, as shown in FIG. 2a, the mean value of the output voltages of the respective three-phase halfwave rectifier circuits.

Also, in the cases of FIGS. 2b and 2c, the same may be applied, except that when the conduction angles of the controlled rectifier elements 5a to 5f exceed 60°, a period ($\phi_1 - \phi_2$) during which any controlled rectifier elements belonging to one set of the three-phase half-wave rectifier circuit are not rendered conductive at all, will appear as shown in FIG. 2c. Since no exciting current is caused to flow in the interphase transformer 4 during the period, the induced voltage thereof is zero and hence the interphase transformer functions as a mere reactor. In this interval, output voltages are mostly absorbed by this reactor and the output of the circuit arrangement becomes intermittent. In this case, although a voltage applied to the electrode 8 and the base metal 8a is smoothed by the reactor 7 to some extent, it is, nevertheless, unavoidable that the ripple component of the output voltage increases. On the other hand, the maximum value of the output voltages of the respective three-phase half-wave rectifier circuits appears on the output side at no-load, but the mean value of the no-load voltages also decreases, as seen in the figures, with an increase in the conduction angle of the controlled rectifier elements for values over 60°.

Curves A, A' and A" in FIG. 3 represent external characteristic curves in the cases where in the direct-current arc welder shown in FIG. 1, the conduction angles of the controlled rectifier elements 5a to 5f are made 0°, 60° and 90°, respectively, while points Vo, Vo' and Vo" represent no-load voltages (in mean values) for the respective cases.

Prior art direct-current arc welders using controlled rectifier elements have been disadvantageous in that where the conduction angle of the controlled rectifier elements is made large (over 60° for the example given in FIG. 1), the ripple component of the output voltage is large and the no-load voltage is reduced, with the result that where a dip transfer type arc welding with a low voltage and a small current is carried out, the arc is difficult to be stably maintained and is easily interrupted.

FIGS. 4a and 4b are waveform diagrams of the arc voltage and current, respectively, which are given for an explanation of the above phenomenon (in the figures, the ripples are omitted.).

A period $t_o - t_1$) is one during which a pointed end of an electrode wire is kept in contact with a molten pool of the parent metal 8a thereby to electrically short-circuit the electrode 8 and the parent metal 8a. During the period, the current value of the welding circuit rises at a rate limited by the reactor 7, and the voltage produced across the terminals of the welding circuit is equivalent to the voltage drop due to the short-circuit current.

The very moment the transfer of the molten metal from the electrode wire to the base metal 8a is completed and the short-circuit between the electrode 8 and the parent metal 8a is opened at time $t_1$, a voltage induced in the reactor 7 is added to the output voltage of the welder to generate an arc between the electrode 8 and the parent metal 8a, but the arc voltage becomes lower as the induced voltage of the reactor 7 decreases. Thereafter, when the voltage applied across the electrode 8 and the base metal 8a is lowered to a value at which no arc may be maintained because of the pulsation in the welder output voltage as previously referred to, then the arc is interrupted.

At that time, the no-load voltage of the welder appears across the terminals of the circuit for welding. The voltage, however, is not sufficient to regenerate an arc, so that the arc remains interrupted during a period ($t_2 - t_3$), and at time $t_3$, the pointed end of the electrode wire is dipped into the molten pool of the base metal 8a thereby to again bring the welder to the short-circuited state. In this dip transfer type arc welding, the weld bead of the base metal is formed such that the molten metal at the pointed end of the electrode as produced by the heat of the arc is transferred from the electrode to the base metal during the period of short-circuiting, so that the presence of interruption of the arc as described above will not provide a sufficient transfer of the molten metal from the electrode to the parent metal, and accordingly, the weld bead becomes incomplete and no satisfactory welding result is obtainable.

It has hitherto been the practice to incorporate the reactor 7 into the welding circuit in order to reduce the ripple component of the output voltage. However, if this reactor is made large in reactance, the current rise when the pointed end of the electrode wire touches the parent metal upon starting will be retarded. As a result, the pointed end of the wire cannot be rapidly made molten and scattered and, hence the start-up of the arc becomes difficult. Therefore, the reactor incorporated in the welding circuit is subject to restrictions on reactance and it has been impossible to fully gain the smoothing of output voltage.

The present invention has solved the problems in the prior art as mentioned above.

An embodiment of the invention is illustrated in FIG. 5. In the figure, parts with the reference numerals 1 to 8 are common to those in FIG. 1, and reference should be made accordingly to the description of FIG. 1 with respect to these parts, but the ignition controlling circuit 6 is not shown.

According to the invention, across the anode and cathode of each of the controlled rectifier elements 5a to 5f connected to the secondary windings 3a and 3b of the main transformer 2 there is connected in parallel a series circuit consisting of one of non-controlled rectifier elements 9a to 9f being the same in the direction of rectification as the controlled rectifier elements 5a to 5f and a current-limiting element 10.

FIG. 6 shows in principle the parallel circuit taken out and corresponding to one phase, and in practice, it is not required to connect the current-limiting element 10 for each phase, but a single current-limiting element 10 may be commonly connected to the non-controlled rectifier elements 9a to 9f of the respective phases as is shown in FIG. 5. The non-controlled rectifier elements 9a to 9f may be usual diodes having a current capacity lower than that of the controlled rectifier elements 5a to 5f, while e.g. a resistor of about 10 ohms or so is used for the current-limiting element 10.

These non-controlled rectifier elements 9a to 9f and the current-limiting element 10 constitute auxiliary rectifier circuits parallel to the controlled rectifier elements 5a to 5f.

A switch 11 incorporated in the auxiliary circuits remains closed during the welding operation.

The operations of other parts than the non-controlled rectifier elements 9a to 9f, current-limiting element 10 and switch 11 in the device shown in FIG. 5 are the same as in the device illustrated in FIG. 1, and the external characteristics of the double-star six-phase rectifier circuit composed of the secondary windings 3a and 3b of the main transformer 2, the interphase transformer 4 and the controlled rectifier elements 5a to 5f vary as represented by straight lines A, A' and A" in FIG. 7 dependent upon the conduction angle of the controlled rectifier elements 5a to 5f. These lines correspond to the horizontal portions of the external characteristic curves A, A' and A" shown in FIG. 4.

A straight line B in FIG. 7 represents the relationship between the voltage and the current supplied to the welding circuit through the auxiliary rectifier circuits, i.e., the series circuits consisting of the non-controlled rectifier elements 9a to 9f and the current-limiting element 10; $V_o$ is the no-load voltage supplied through the auxiliary rectifier circuits; and $I_o$ is the short-circuit current caused to flow into the welding circuit.

The performance characteristics of the direct-current arc welder provided with such auxiliary rectifier circuits, are as follows:

Assuming now that the intersection points between the straight lines A, A' and A" and the straight line B in FIG. 7 be p, p' and p" respectively, then in the region on the right of the points p, p' and p", electric power is supplied to the welding circuit mainly through the controlled rectifier elements 5a to 5f and even if a current is caused to flow through the non-controlled rectifier elements 9a to 9f during the non-conduction period of the controlled rectifier elements 5a to 5f, the proportion accounted for by the current is slight. In contrast, in the region on the left of the points p, p' and p", a voltage higher than the one supplied through the controlled rectifier elements 5a to 5f is supplied to the welding circuit through the non-controlled rectifier elements 9a to 9f, and at no-load, there is always generated across the output terminals a fixed open voltage represented by $V_o$. It will be accordingly understood that the external characteristics for the welder as a whole become as represented by the full lines in FIG. 7. Herein the value of the no-load voltage $V_o$ is equal to that of the no-load voltage in the case where the conduction angle of the controlled rectifier elements is 0° as illustrated in FIG. 2a.

The value of the current-limiting element 10 determining the magnitude of the short-circuit current $I_o$ is determined so that the DC power necessary to regenerate the arc may be supplied to the welding circuit through the non-controlled rectifier elements 9a to 9f upon the extinction of the arc, while the DC power required to maintain the arc may be supplied to the welding circuit mainly through the controlled rectifier elements 5a to 5f.

According to the invention, as is apparent from FIG. 7 the maximum no-load voltage is always supplied to the welding circuit through the non-controlled rectifiers 9a to 9f at the extinction of the arc, irrespective of the magnitude of the conduction angle of the controlled rectifier elements 5a to 5f. Consequently, even if, in case of the over conduction angle exceeding 60° of the controlled rectifier elements 5a to 5f, there occurs a momentary interruption of the arc due to such pulsation of the output voltage as illustrated in FIG. 2c, reignition will be immediately attained, and the arc may be stably sustained even with a low arc voltage.

FIGS. 8a and 8b show wave forms of the arc voltage and current respectively (with the ripples omitted), in the case where a dip transfer type arc welding at low voltages and small currents are employed, using the direct-current arc welder of the invention.

Experiments revealed that in case wherein a direct-current arc welder having the maximum secondary no-load voltage of 45 volts is used and wherein the welding is done with a current of 100 amperes while a consumable electrode wire being 1.2 mm in diameter is automatically fed towards the weld of the base metal and while a shielding gas consisting of 8 l/min of carbon dioxide gas and 2 l/min of orgon gas is caused to flow along the electrode, without the auxiliary rectifier elements an arc interruption occurs at an arc voltage of 19 volts, whereas with the device added with the auxiliary rectifier circuits according to the invention no arc interruption appears, even when the arc voltage is reduced to 14 volts or so, and the arc may be maintained in a stabilized manner as shown in FIG. 8b whereby a smooth welding bead is obtainable.

It has been made sure that the current-limiting element 10 is sufficiently effective herein even when the value thereof is as high as 10 ohms. Accordingly, the non-controlled rectifier elements 9a to 9f may satisfactorily be those of a capacity of several amperes and besides the provision of an additional auxiliary power source for reignition is not required, with the result that a simplified and inexpensive construction is permitted.

In addition, since it is not needed to make the value of the reactor larger necessary the arc start-up is never interfered with.

Although the above-described embodiment is directed to a case in which the controlled rectifier elements are used in the double-star six-phase rectifier circuit, the invention may prevent the arc interrupting phenomenon due to pulsation of the output, also when applied to a case in which controlled rectifier elements are employed in other rectifier circuits, such as the three-phase full-wave rectifier circuit.

Generally, in a direct-current arc welder, the secondary voltage of the welder usually remains cut-off for safety during the cessation of welding, and it is required in the present invention to simultaneously break the auxiliary rectifier circuits in this case. The switch 11 is provided for this purpose.

What is claimed is:

1. A direct-current arc welder comprising a main transformer provided with one set of primary windings connected to a three-phase AC power source and two sets of three-phase secondary windings having a phase difference of 60° from each other, an interphase transformer connected between neutral points of said two sets of secondary windings and provided with a center tap, a group of controlled rectifier elements each having its anode side connected to one terminal of said each secondary winding, means to connect the cathode side of said each controlled rectifier to one end of a welding circuit including an electrode and a parent metal, means to connect said center tap of said interphase transformer to the other end of said welding circuit, a reactor incorporated into said welding circuit, a controlling device for controlling the conduction angle of said controlled rectifier elements thereby to adjust the electric power supplied to said welding circuit, and non-controlled rectifier elements each connected across the anode and cathode of each one of said group of controlled rectifier elements through a current-limiting element , said controlled rectifier elements and said non-controlled rectifier elements being connected in the same direction, said current-limiting element being of such a value that the DC power necessary to maintain the arc is supplied to said welding circuit mainly through said controlled rectifier elements, while the DC power required to regenerate the arc after extinction is supplied to said welding circuit through said non-controlled rectifier elements.

2. In a direct-current arc welding apparatus having a transformer including a primary winding and at least one secondary winding comprising two sets of three-phase secondary windings having a phase difference of 60° from each other, an interphase transformer connected between neutral points of said two sets of secondary windings, and provided with a center tap, said center tap being connected to a parent metal , said primary winding being connected to a three-phase AC power source, controlled rectifier elements each anode of which being connected to said secondary winding of said transformer and the cathodes of which are connected to a welding circuit which includes a welding electrode and said parent metal, means, connected to each of said controlled rectifier elements, for controlling the conduction cycle thereof, to thereby adjust the amount of power being supplied through said controlled rectifier elements to said welding circuit, the improvement comprising:

first means for effecting the supply of DC power to said welding circuit necessary for maintaining an arc through said controlled rectifier elements;

second means for effecting the supply of DC power necessary to generate the arc after extinction; and a reactive element connected between said welding electrode and said first and second means;

wherein said first means comprises a current-limiting circuit having predetermined characteristics and wherein said second means comprises non-controlled rectifier elements, each connected in series with said current-limiting element, said respective series connection of said current limiting element and said non-controlled rectifier elements being connected in parallel across the anodes and cathodes of said respective controlled rectifier elements.

* * * * *